(12) United States Patent
Matsuda

(10) Patent No.: US 8,441,665 B2
(45) Date of Patent: May 14, 2013

(54) PRINT SYSTEM INCLUDING IMAGE-FORMING APPARATUS FOR PROVIDING WORKFLOW

(75) Inventor: Kotaro Matsuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1290 days.

(21) Appl. No.: 11/951,233

(22) Filed: Dec. 5, 2007

(65) Prior Publication Data

US 2008/0154685 A1 Jun. 26, 2008

(30) Foreign Application Priority Data

Dec. 21, 2006 (JP) ................................. 2006-344280

(51) Int. Cl.
*G06F 3/12* (2006.01)
(52) U.S. Cl.
USPC .......................... 358/1.15; 358/1.13; 705/7.21
(58) Field of Classification Search ............... 358/1.1, 358/1.13, 1.15, 1.18, 400, 442; 705/221; 709/201, 709/217, 220, 226; 710/15; 715/255, 763, 715/764, 839; 717/103; 718/100
See application file for complete search history.

(56) References Cited

U.S. PATENT DOCUMENTS

| | | | | |
|---|---|---|---|---|
| 5,550,646 A | * | 8/1996 | Hassan et al. ................. | 358/442 |
| 6,430,538 B1 | * | 8/2002 | Bacon et al. .................. | 705/7.21 |
| 6,728,947 B1 | * | 4/2004 | Bengston ....................... | 717/103 |
| 2002/0136559 A1 | * | 9/2002 | Simpson et al. ................... | 399/9 |
| 2004/0080770 A1 | * | 4/2004 | Hirose et al. ................... | 358/1.13 |
| 2004/0194010 A1 | * | 9/2004 | Kirihara et al. ................ | 715/500 |
| 2005/0015711 A1 | * | 1/2005 | Yamamoto et al. ........... | 715/500 |
| 2005/0055475 A1 | * | 3/2005 | MacKay et al. ................ | 710/15 |
| 2005/0068547 A1 | * | 3/2005 | Negishi et al. ................. | 358/1.1 |
| 2006/0136488 A1 | * | 6/2006 | Mifune et al. ................. | 707/102 |

FOREIGN PATENT DOCUMENTS

| | | |
|---|---|---|
| JP | 2003-091402 A | 3/2003 |
| JP | 2004-133926 A | 4/2004 |
| JP | 2004-151897 A | 5/2004 |
| JP | 2004-287859 A | 10/2004 |
| JP | 2005-148993 A | 6/2005 |
| JP | 2006-018492 A | 1/2006 |
| JP | 2006-053891 A | 2/2006 |

* cited by examiner

*Primary Examiner* — King Poon
*Assistant Examiner* — David S Cammack
(74) *Attorney, Agent, or Firm* — Canon USA, Inc., IP Division

(57) ABSTRACT

An image-forming apparatus is capable of communicating with a server apparatus for performing a workflow. The image-forming apparatus includes a receiving unit configured to receive definition information of a flow defined in a workflow from the server apparatus and a control unit configured to control display of a screen of the image-forming apparatus based on the flow definition information received by the receiving unit. The image-forming apparatus further includes a notification unit configured to notify the server apparatus of a completion of the flow by the image-forming apparatus.

13 Claims, 17 Drawing Sheets

FIG. 11

| 1101 | 1102 | 1103 |
|---|---|---|
| | FLOW DEFINITION ID | FLOW DEFINITION NAME |
| | 1 | TRANSPORTATION FEE REQUEST FLOW |
| | 2 | PURCHASE REQUEST FLOW |
| | 3 | CONTRACT CONSIDERATION FLOW |
| | ⋮ | ⋮ |

| 1111 | 1112 | 1113 | 1114 | 1115 |
|---|---|---|---|---|
| | FLOW DEFINITION ID | STEP ID | STEP NAME | SUBFLOW ID |
| | 1 | 1 | DRAFT | |
| | 1 | 2 | REQUEST | 1 |
| | 1 | 3 | APPROVE | |
| | ⋮ | ⋮ | ⋮ | ⋮ |

FIG. 12

| SUBFLOW DEFINITION ID 1201 | SUBFLOW DEFINITION NAME 1202 |
|---|---|
| 1 | SCAN TRANSMISSION |
| 2 | ORDER SHEET PRINT/FAX |
| ⋮ | ⋮ |

| SUBFLOW DEFINITION ID 1211 | SUBSTEP ID 1212 | SUBSTEP NAME 1213 |
|---|---|---|
| 1 | 1 | SCAN INSTRUCTION SCREEN |
| 1 | 2 | PREVIEW CONFIRMATION SCREEN |
| 1 | 3 | TRANSMISSION COMPLETION SCREEN |
| ⋮ | ⋮ | ⋮ |

FIG. 13

```
                        1301
                         ⌇
1302 ─── <?xml version="1.0"?>
         -<subflow_definition>
1311 ───   -<sub_process id="001">
1312 ───     <screen>StartScaning</screen>
1313 ───     <guidance> Please set a manuscript and start scanning. </guidance>
1314 ───     -<option_settings>
                 <apply>ColorMode</apply> ── 13141
                 <apply>Resolution</apply> ── 13142
                 <apply>FileFormat</apply> ── 13143
             </option_settings>
1315 ───     -<forward>
                 <function>Scan</function>
                 <target>002</target>
             </forward>
1316 ───     -<backward>
                 <target>home</target>
             </backward>
           </sub_process>
1321 ───   -<sub_process id="002">
1322 ───     <screen>ScanPreview</screen>
             <guidance> Please confirm a preview image. </guidance>
           - <forward>
                 <function>SendToServer</function>
                 <target>003</target>
             </forward>
             <backward>001</backward>
           </sub_process>
1331 ───   -<sub_process id="003">
1333 ───     <screen>SendingResult</screen>
             <guidance>Transmission has succeeded. </guidance>
           - <option_settings>
                 <apply>SendingDate</apply>
                 <apply>FileName</apply>
             </option_settings>
             <backward>home</backward>
           </sub_process>
         </subflow_definition>
```

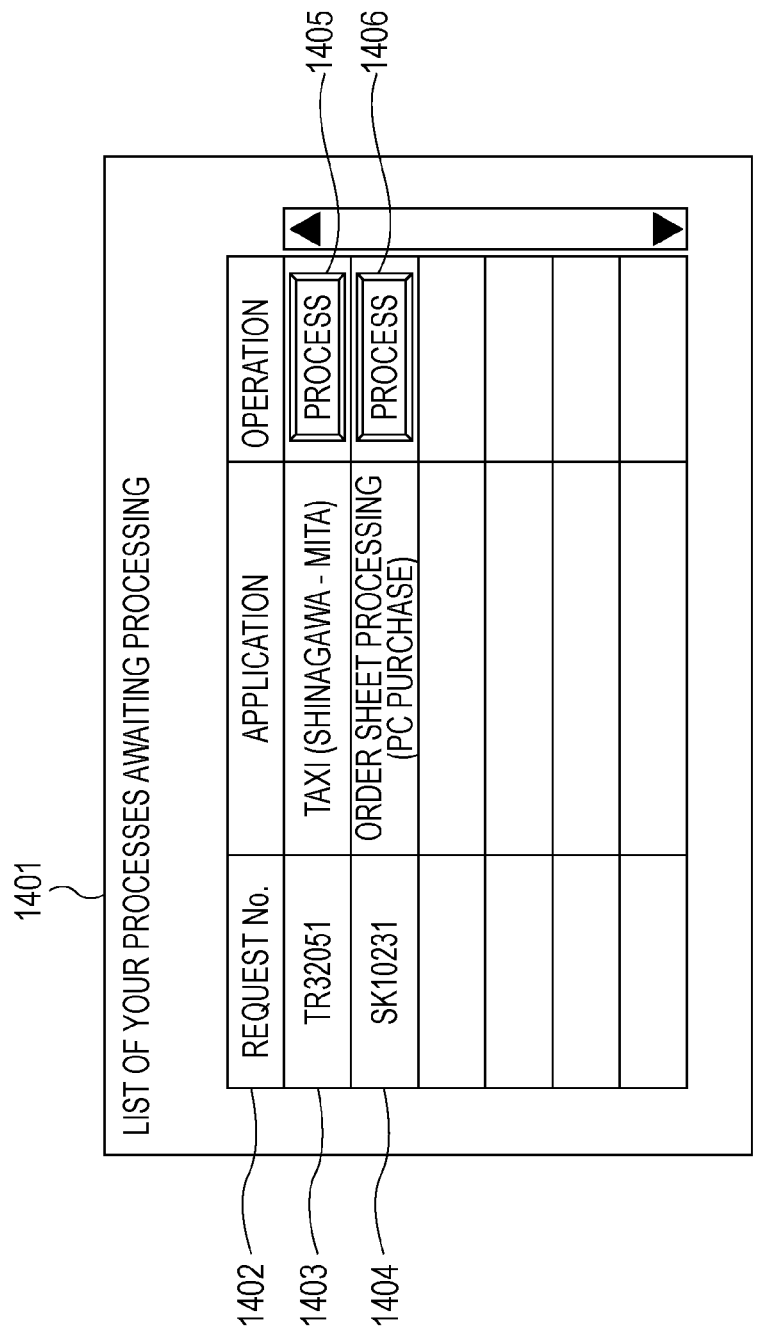

PRINT SYSTEM INCLUDING IMAGE-FORMING APPARATUS FOR PROVIDING WORKFLOW

BACKGROUND OF THE INVENTION

1. Field of the Invention

The present invention relates to a print system including an image-forming apparatus (e.g., multi-function product).

2. Description of the Related Art

In recent years, various kinds of workflow systems have been proposed and put into practical use for the purpose of automating business processing, clarifying business processing procedures, and facilitating storing/monitoring/browsing of business processing results. In some of these systems, a workflow system is constructed in an application server, and a user performs business processing in the workflow system via a client using a PC.

On the other hand, an application execution environment typified by a Java (registered trademark) environment may be implemented in MFPs (Multi-Function Products). If a program that operates in such an environment is developed, it is possible to generate an application using functions provided by an MFP. For example, it is possible to generate an application utilizing functions such as scanning, printing, and sending/receiving of faxes, which are functions provided by the MFP. Furthermore, it is also possible to generate an application with which system coordination is performed by communicating with a server via a network.

According to Japanese Patent Laid-Open No. 2006-053891, a system has been proposed in which processing can be progressed using the operation unit of an MFP in accordance with a workflow system for managing operation steps of an operator in a centralized copy room and a print center. In this proposal, one job (copy job, scan job, print job, bookbinding job, etc.) of an MFP is linked with a corresponding step of a workflow. This is a feature in a POD (Print On Demand) workflow and is suitable for a workflow system to perform progress management of operations performed by the MFP one by one.

However, in the above-described example of the related art, one step of the workflow is linked with one job of the MFP. For this reason, only the processing screen of a certain job can be shown on the operation unit screen of the MFP. Furthermore, since the example of the related art has little power of expression, it is not possible to provide, to a user, an operation screen that gives guidance regarding a complex operation flow involving a plurality of steps. As a result, the following problems arise.

A first problem is that operation using a plurality of functions of an MFP, which is an image-forming apparatus, may not be realized in cooperation with a workflow system provided by a server apparatus. For example, there may be a case in which, in one step, a subflow is started, a user prints a document, and the print result is faxed by the user.

A second problem is that the display screen transition of the MFP may not be set in cooperation with a workflow system provided by a server apparatus. For example, a case is assumed in which, in one step, a user starts a subflow in order to perform a scan process. A certain user may demand a screen transition, such as a scan instruction screen, a preview screen, and a transmission completion screen. On the other hand, another user may demand a screen transition, such as a scan instruction screen and a transmission completion screen. Regeneration of an application of the MFP for each demand of the user can take time and effort, and lead to increased cost, which is undesirable.

SUMMARY OF THE INVENTION

An embodiment of the present invention is directed to an image-forming apparatus capable of communicating with a server apparatus for performing a specific workflow. The image-forming apparatus includes: a receiving unit configured to receive definition information of a flow defined in a workflow from the server apparatus; a control unit configured to control display of a screen of the image-forming apparatus based on the definition information of the flow received by the receiving unit; and a notification unit configured to notify the server apparatus of a completion of the flow by the image-forming apparatus.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 11 shows an example of a table for storing definition information on flow definition and subflow definition.

FIG. 12 shows an example of a table for storing definition information on flow definition and subflow definition.

FIG. 13 shows an example in which subflow definition is represented using XML.

FIG. 14 shows an example of a screen displayed on the MFP 100.

DESCRIPTION OF THE PREFERRED EMBODIMENTS

Embodiments of the present invention will be described below in detail with reference to the attached drawings.

Figure 1:
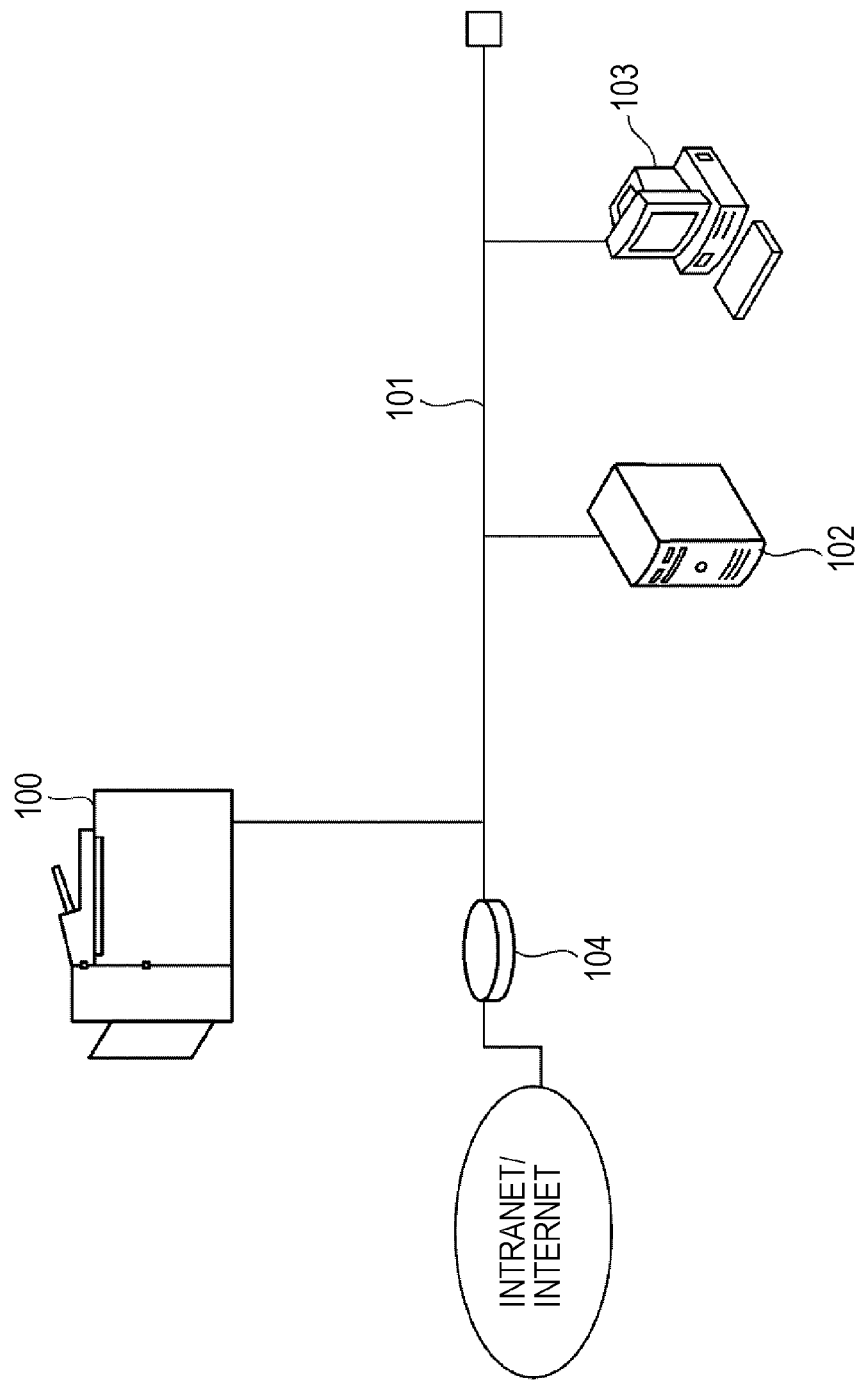
FIG. 1 is a schematic view showing an example of a system configuration according to an embodiment of the present invention.

FIG. 1 is a schematic view showing an example of a system configuration according to an embodiment of the present invention.

In FIG. 1, reference numeral 100 denotes a multi-function product (hereinafter abbreviated as an "MFP"). Reference numeral 101 denotes a network that mediates communication among devices. Reference numeral 102 denotes a server computer used as an application server or the like. Reference numeral 103 denotes a personal computer (hereinafter abbreviated as a PC) used as a client or the like. Reference numeral 104 denotes a gateway device used when connection with an intranet/the Internet or the like is to be made. The segment of the network in which each device described herein is located is not particularly limited. As long as communication among devices is possible even in any arrangement topology, the present system can be implemented.

Figure 2:
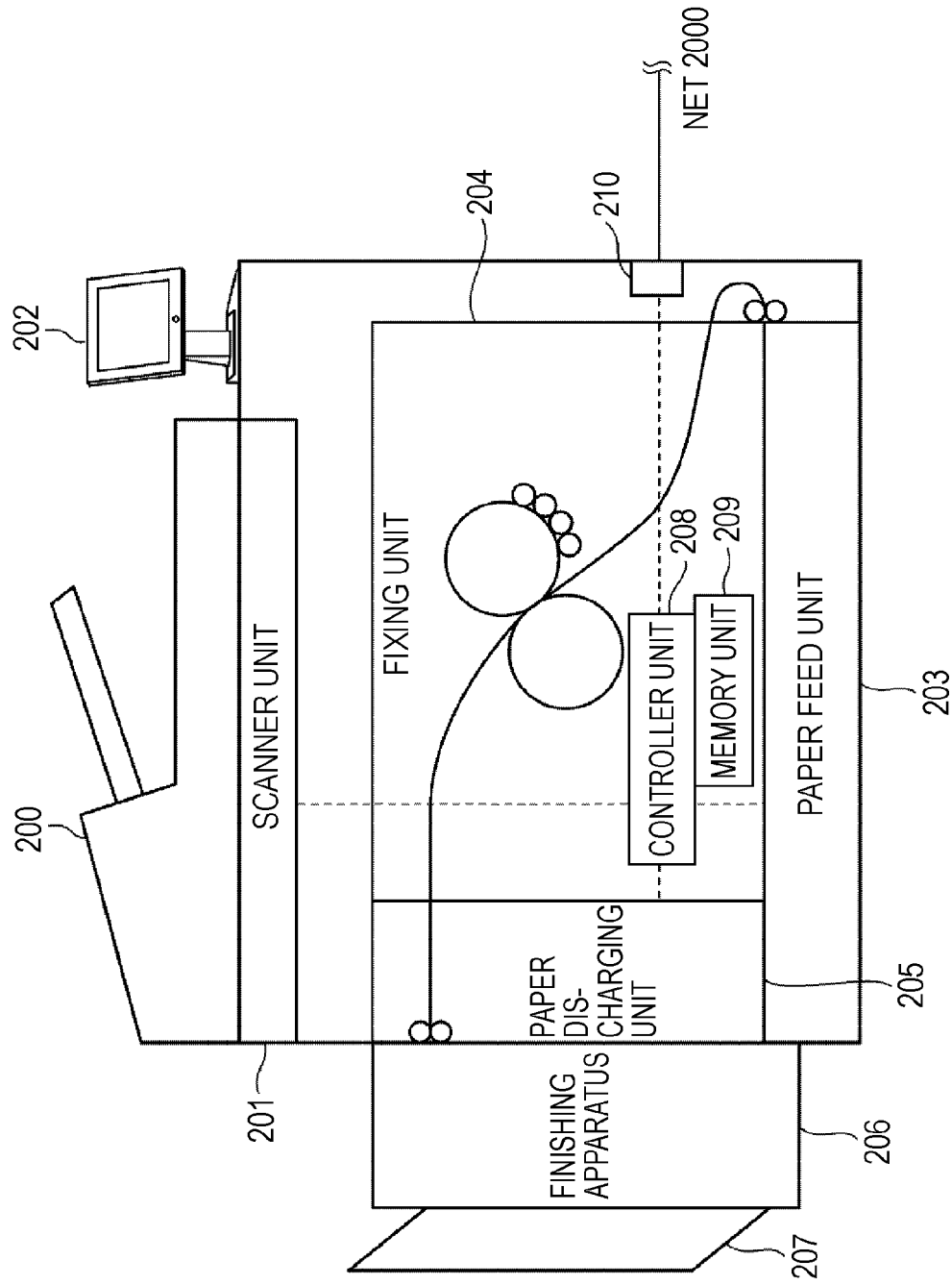
FIG. 2 shows an example of the internal configuration of an MFP 100 shown in FIG. 1.

FIG. 2 shows an example of the internal configuration of the MFP 100 shown in FIG. 1. Reference numeral 200 denotes an automatic manuscript feed unit (hereinafter referred to as a "feeder"). Reference numeral 201 denotes a scanner unit for a manuscript. The scanner unit 201 reads a manuscript using a scanner and converts it into image data or into a specific page description language, and then stores it in an HDD. Reference numeral 202 denotes a user interface (hereinafter abbreviated as a "UI") unit. The user interface 202 enables operation of the functions of the MFP 100 and also enables operation of an application installed in the MFP 100. Reference numeral 203 denotes a paper supply unit that supplies printing paper. Reference numeral 204 denotes a fixing unit having a function of fixing toner on supplied paper. Reference numeral 205 denotes a paper discharging unit. Reference numeral 206 denotes a finishing apparatus. Reference numeral 207 denotes an output tray.

A controller unit 208 centrally controls the fixing unit, the paper discharging unit, the finishing unit, and the scanner unit. The controller unit 208 also controls the reception of a network interface 210. A NET 2000 is a network communication path that corresponds to the network 101 in FIG. 1. In a memory unit 209, various kinds of programs including an application are stored, and a program is read and executed by the controller unit 208. Furthermore, flow definition information containing screen transition information can also be stored in the memory unit 209. In an embodiment, the memory unit 209 is formed as a memory map shown in FIG. 4 (to be described later).

Figure 3:
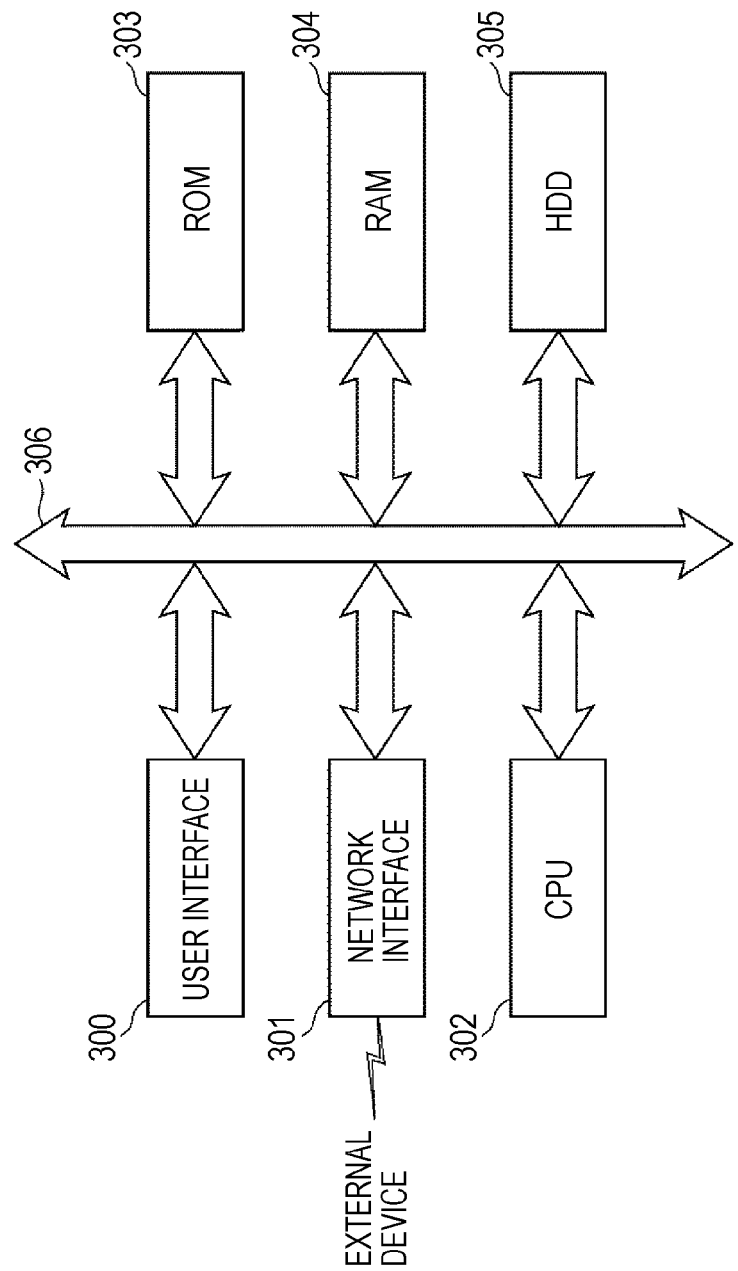
FIG. 3 shows an example of the logical configuration of information processing functions of an application server 102 and a client 103 shown in FIG. 1.

FIG. 3 shows an example of the logical configuration of information processing functions of the application server 102 and the client 103 of FIG. 1. Here, the information processing functions of the server computer 102 and the PC 103 are shown. Reference numeral 300 denotes a user interface unit for providing a user interface to an operator. Reference numeral 301 denotes a network interface unit for performing communication with external devices via a network. Reference numeral 302 denotes a CPU that executes a control program, and reference numeral 303 denotes a ROM in which embedded programs and data are recorded. Reference numeral 304 denotes a RAM, which is a temporary memory area. Reference numeral 305 denotes an HDD having a large-capacity storage area. The units are interconnected with one another via an input/output interface 306.

The application server 102 stores screen transition information, which is an example of flow definition information, in the HDD 305. Information stored in the HDD is transmitted as necessary to the MFP 100 via the network interface unit by using the CPU 302. The CPU 302 executes a program. A Web server 702, the application server 102, a database 705, and a file system 706 are stored in the HDD 305, and these are read or executed by the CPU. Of course, these may be stored in separate computers (not shown) and may be centrally controlled.

Figure 4:
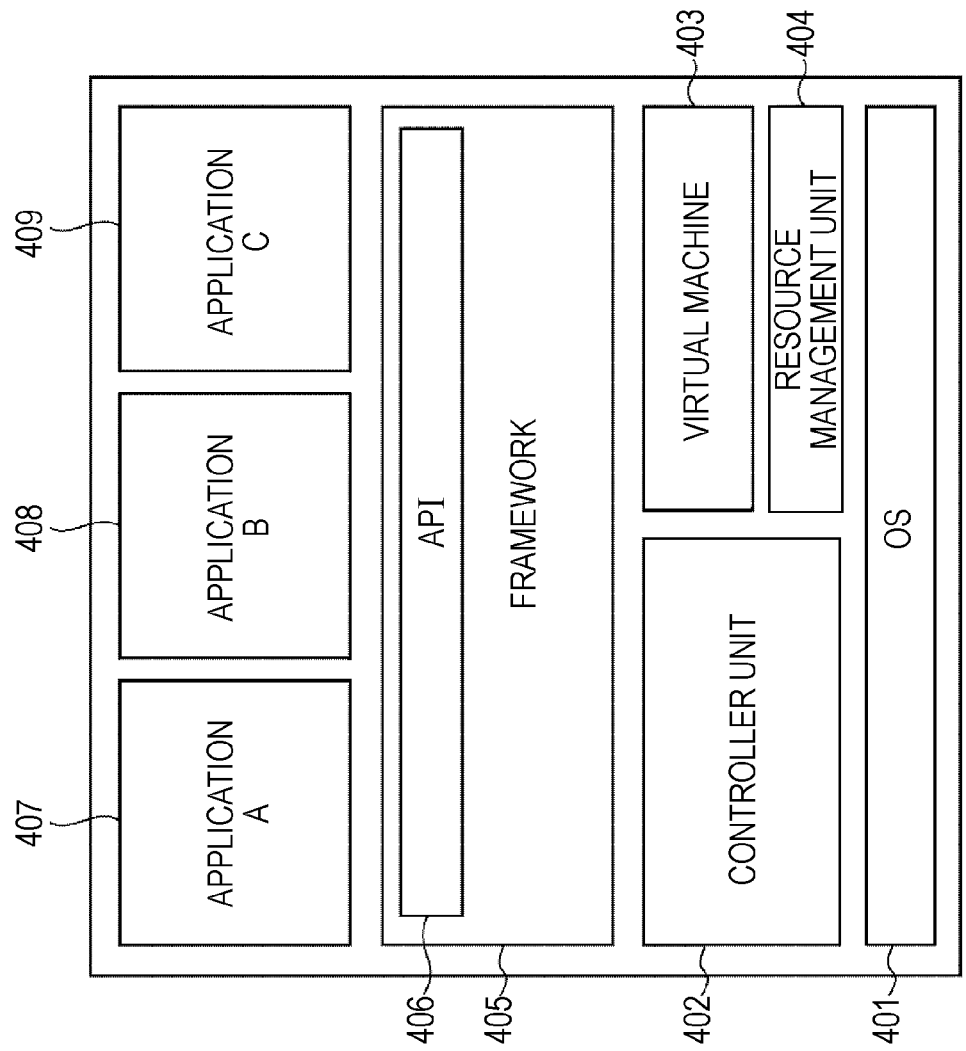
FIG. 4 shows an example of a software configuration in which an application program can be executed in the MFP 100.

FIG. 4 shows a software configuration enabling an application program to be executed in the MFP 100. Reference numeral 401 denotes an example of an execution environment in which MFPs and SFPs are controlled, which is, in general, each module of a real-time OS or a library group, which can control various functions of the MFP and the SFP in real time. The library group can instruct the CPU to control each function containing option devices of an MFP and an SFP and an expansion card. Then, the execution environment is realized by a module group that provides an interface command to an application that operates in a high level of the execution environment. Reference numeral 402 denotes a controller unit that operates in the execution environment 401. The controller unit 402 includes a scanning unit of an MFP, a printer unit of the MFP and an SFP, and a module for controlling each section of the MFP, such as a PDL processor. Reference numeral 403 denotes an optimum execution environment for the purpose of executing a specific application, and the execution environment is implemented by, for example, a virtual machine of a Java (registered trademark) environment. Reference numeral 404 denotes a resource management unit for managing resources used by the execution environment 403, and the resource management unit operates in the OS 401. The resource management unit 404 performs management so that, when all the application programs in the virtual machine 403, a framework 405 (to be described later), or the OS 401, which form the execution environment, use the resources, such as memory, resources of a predetermined amount or more cannot be used.

Reference numeral 405 denotes a framework for an application executed in the virtual machine 403. Reference numeral 406 denotes an application programming interface (hereinafter abbreviated as an "API") provided by the framework 405. Reference numerals 407, 408, and 409 each denote an application executed in the framework 405. Services that are commonly necessary, function modules that are often used, a library group that is necessary to control each function of an MFP by accessing the controller unit 402, and the like are provided in advance in the framework 405. As a result, by using the API 406, it is possible to efficiently develop and execute an application 407. An application A has, for example, a browser function or controls a communication function with a server. The application A also interprets and displays the information of FIG. 13 and controls the screen transition of FIGS. 14 to 16. Furthermore, the application A detects various instructions (facsimile transmission, printing, and transmission of a file to the server) input from the user interface of the application A. Then, by using the API and the framework, the application A calls the controller unit. As a result, an API corresponding to facsimile transmission, printing, or transmission of a file to the server is called, and the OS is controlled as necessary. In response, the MFP 100 performs facsimile transmission, printing, or transmission of a file to the server.

Figure 5:
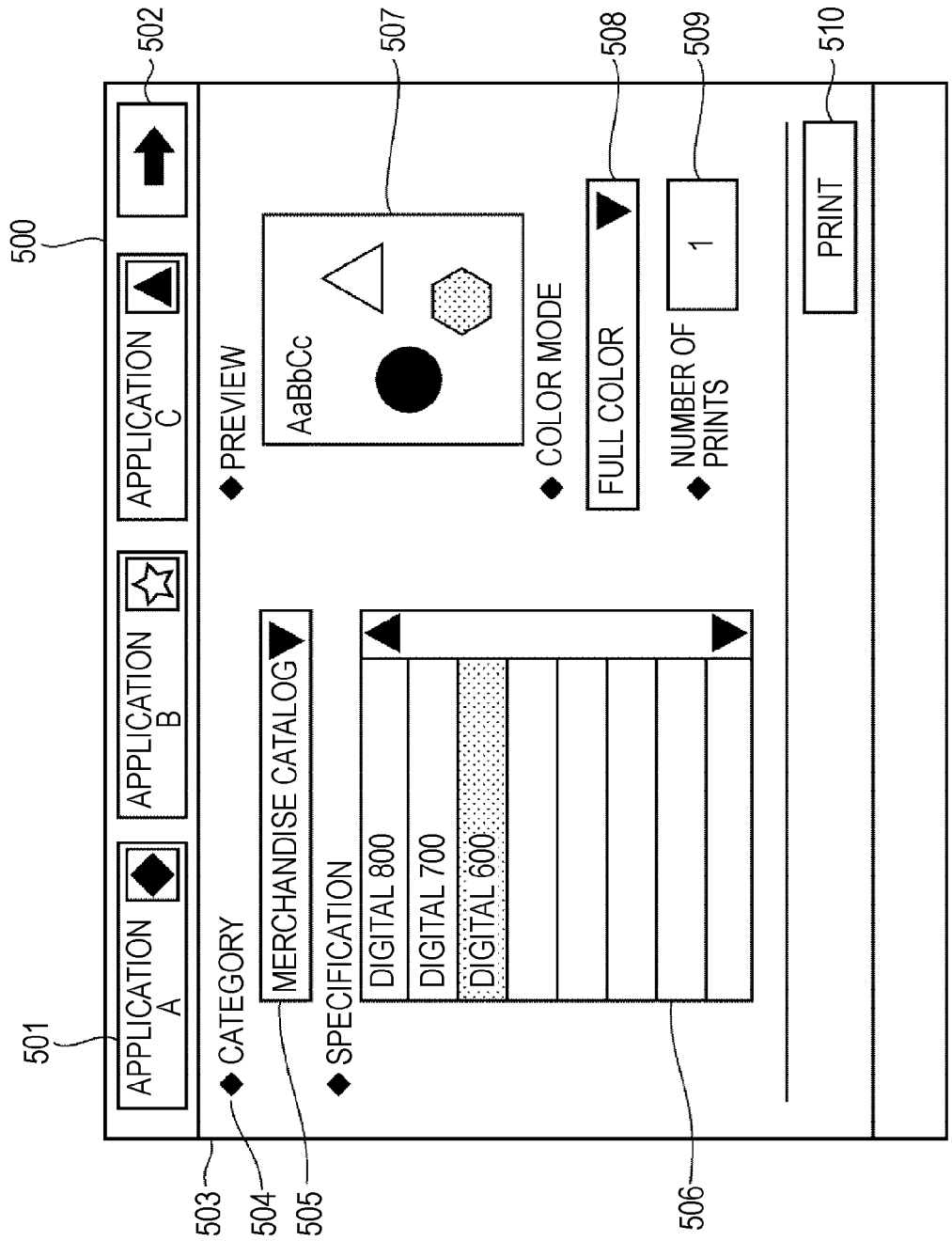
FIG. 5 shows an example of a representation of an application 407 or the like in a UI unit 202.

FIG. 5 shows an example of a representation of an application 407 or the like in the UI unit 202. Reference numeral 500 denotes an entire area used as the display screen of the UI unit. Reference numeral 501 denotes a control button for switching between applications. Reference numeral 502 denotes a control button used to scroll a list of applications when all the applications cannot be displayed within one screen. Reference numeral 503 denotes an area of a control panel that can be used by the application. Reference numerals 504, 505, 506, 507, 508, 509, and 510 denote various control panels that can be used by the application. The applications shown as an example here are in a form involving UI typified by an applet or the like. However, applications that can be executed in the framework 405 are not limited to these. Various application execution forms, such as a sublet capable of providing a Web interface, and a form in which processing is continued as services in the background, can exist. At this point, an example is shown in which, when a category of a merchandise catalog is selected, a choice list displayed in a section denoted by a reference numeral 506. Reference numeral 508 denotes an input unit for inputting print setting from the application to the image-forming apparatus. The number of pages can be input using the control button 509. Reference numeral 507 displays a preview of image data of a catalog selected as DIGITAL 600 in the choice list 506. Reference numeral 510 denotes an instruction part. When the print instruction part 510 is pressed, a file of the selected DIGITAL 600 is formed as an image, and is printed and output.

Figure 6:
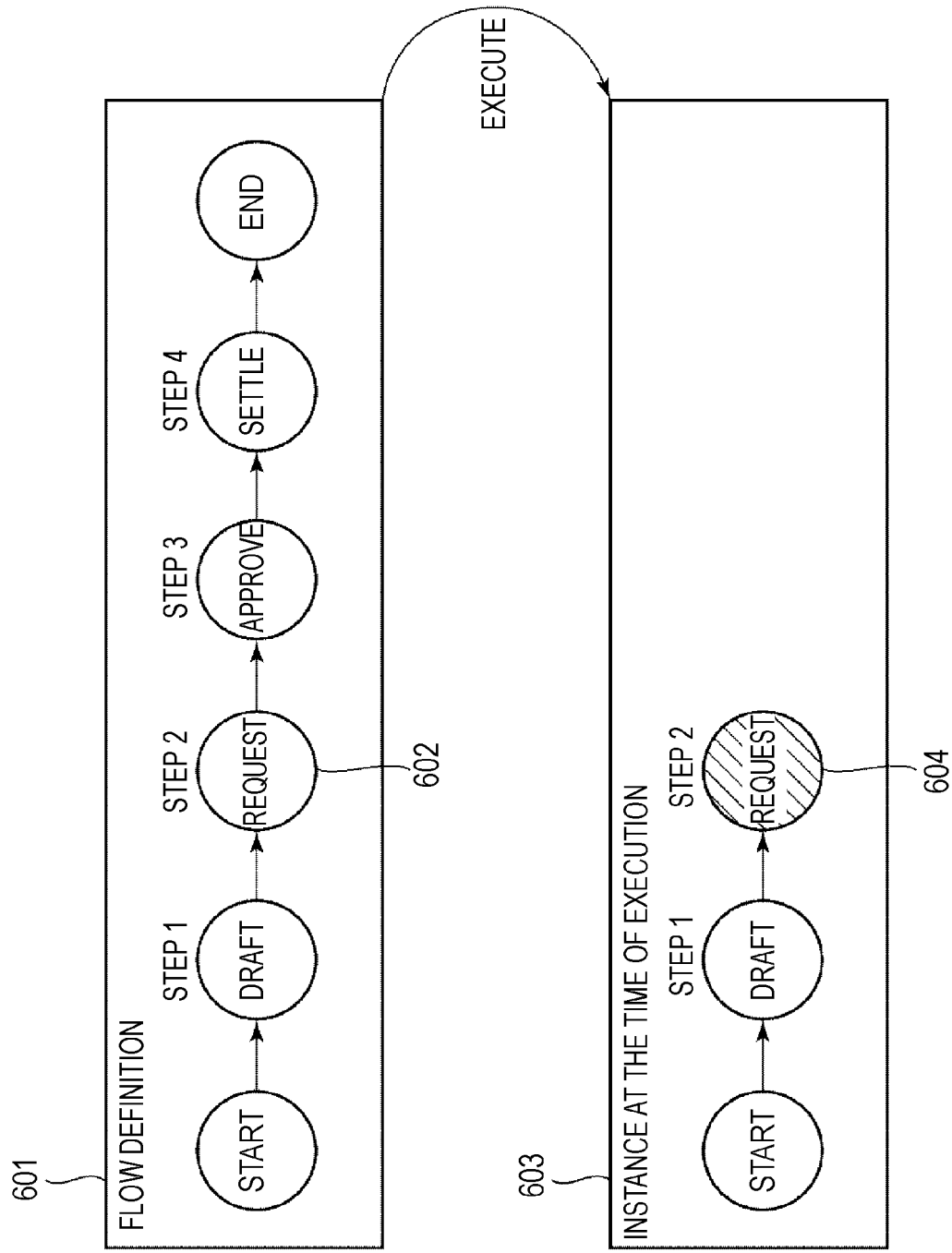
FIG. 6 shows an example of the definition of workflow operation.

FIG. 6 is an illustration showing the operation of a workflow. Reference numeral 601 denotes a flow definition that is definition information of processing content processed by a workflow system and a processing procedure. The workflow system manages the execution of each step from the start of the processing until it is completed. The user designs in advance the flow definition in accordance with a job to which the workflow is applied. Reference numeral 603 denotes an instance at the time of execution when the flow definition 601 is executed by the workflow system. Each time the step progresses, an instance at the time of execution is generated for each step. This instance at the time of execution for each step is referred to as a work item. For example, step 602 of "request" corresponding to step 2 of the flow definition 601 is generated as a work item 604 at the time of execution.

Figure 7:
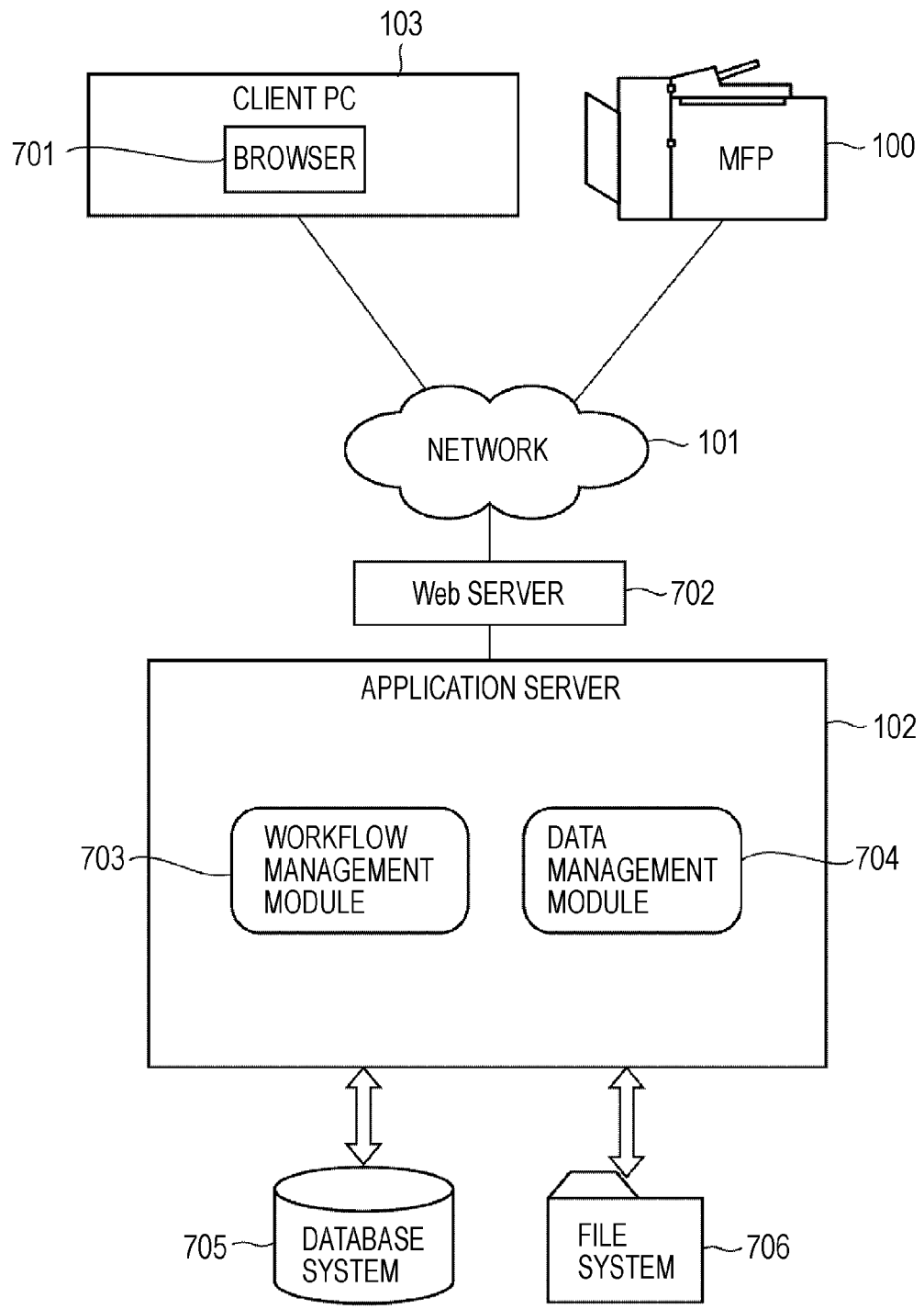
FIG. 7 shows an example of the configuration of a workflow system.

FIG. 7 shows an example of the configuration of a workflow system. In this example of the configuration, a workflow management module 703 and a data management module 704 are located in the application server 102. The application server 102 in FIG. 1 corresponds to the application server 102 in FIG. 7. The workflow management module 703 processes definition information, information at the time of execution, history information, and the like regarding the execution of the workflow. The data management module 704 processes various business data processed by the workflow. The application server 102 can be connected to a database system 705, can store, in a database, various kinds of information and various kinds of business data/data management information regarding the execution of the workflow used by the workflow system, and can search, update, and delete them when necessary. In a similar manner, by using a file system 706, it is possible to operate, store, and edit a file entity handled as various kinds of data. In this example of the configuration, the workflow system is configured as a Web system. The client PC 103 can access the application server 102 via a network 101 by using a browser 701 or the like and can use various kinds of functions of the workflow system. In general, the Web server 702 can be disposed according to applications, such as allocation of a Web request. In a similar manner, it is also possible for the MFP 100 to access the application server 102 via the network 101 and to use various kinds of functions of the workflow system. The definition information of the subflow can also be stored in the database system 705.

Figure 8:
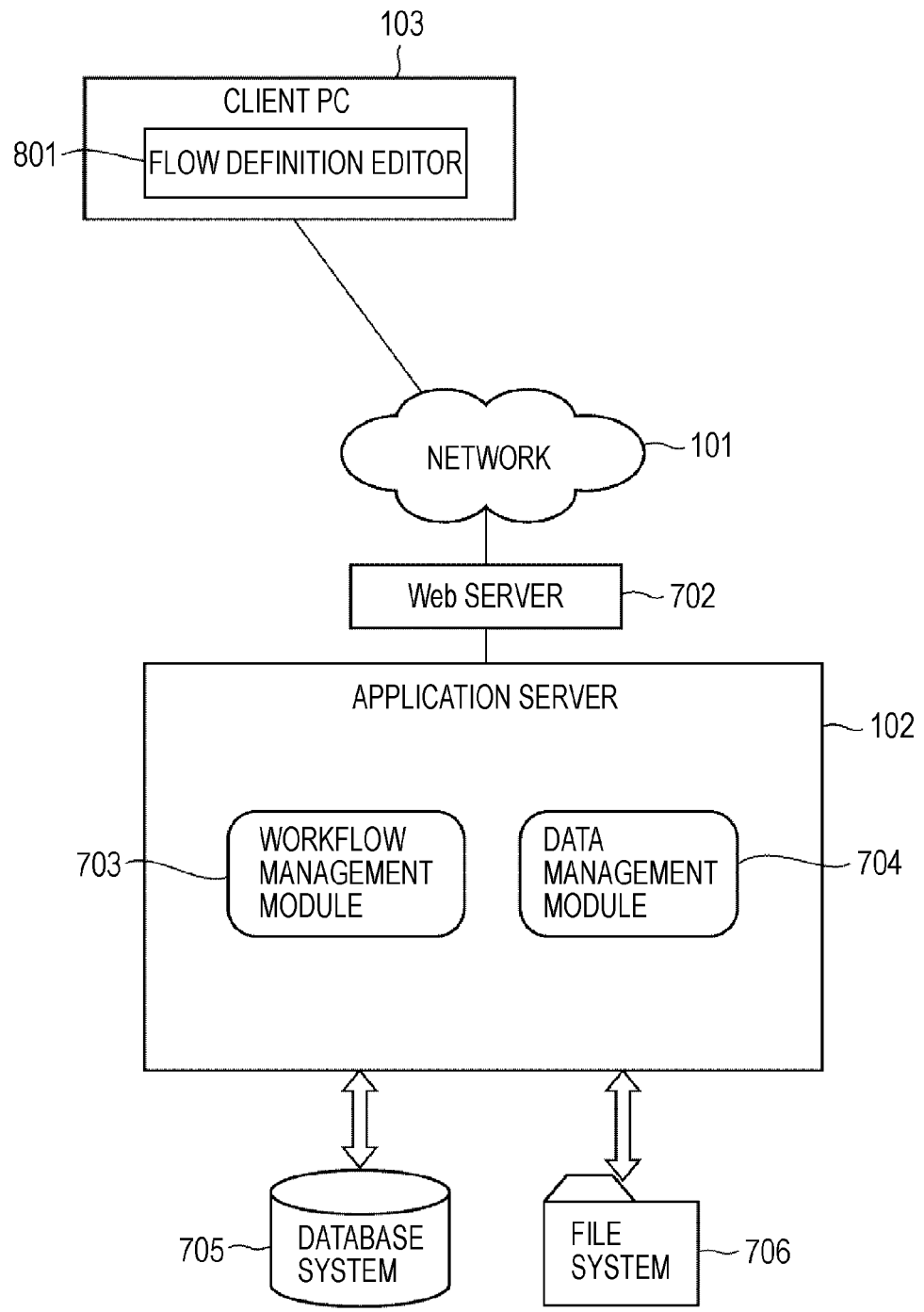
FIG. 8 shows an example of the configuration of a workflow system.

FIG. 8 shows an example of the configuration of a workflow system. An example of the configuration of a flow definition editor for creating the flow definition 601 will be described. Reference numeral 801 denotes a flow definition editor, which is an application used to create the flow definition 601. The flow definition editor 801 is executed in the client PC 103. Access is made to the application server 102, information necessary for a flow definition is received, and the user creates and edits a flow definition according to a job to be processed by the workflow. The created flow definition is registered in the workflow system and is used at the time of execution of the workflow. The browser and the flow definition editor may be performed by the same client PC and may also be performed by different PCs.

Figure 9:
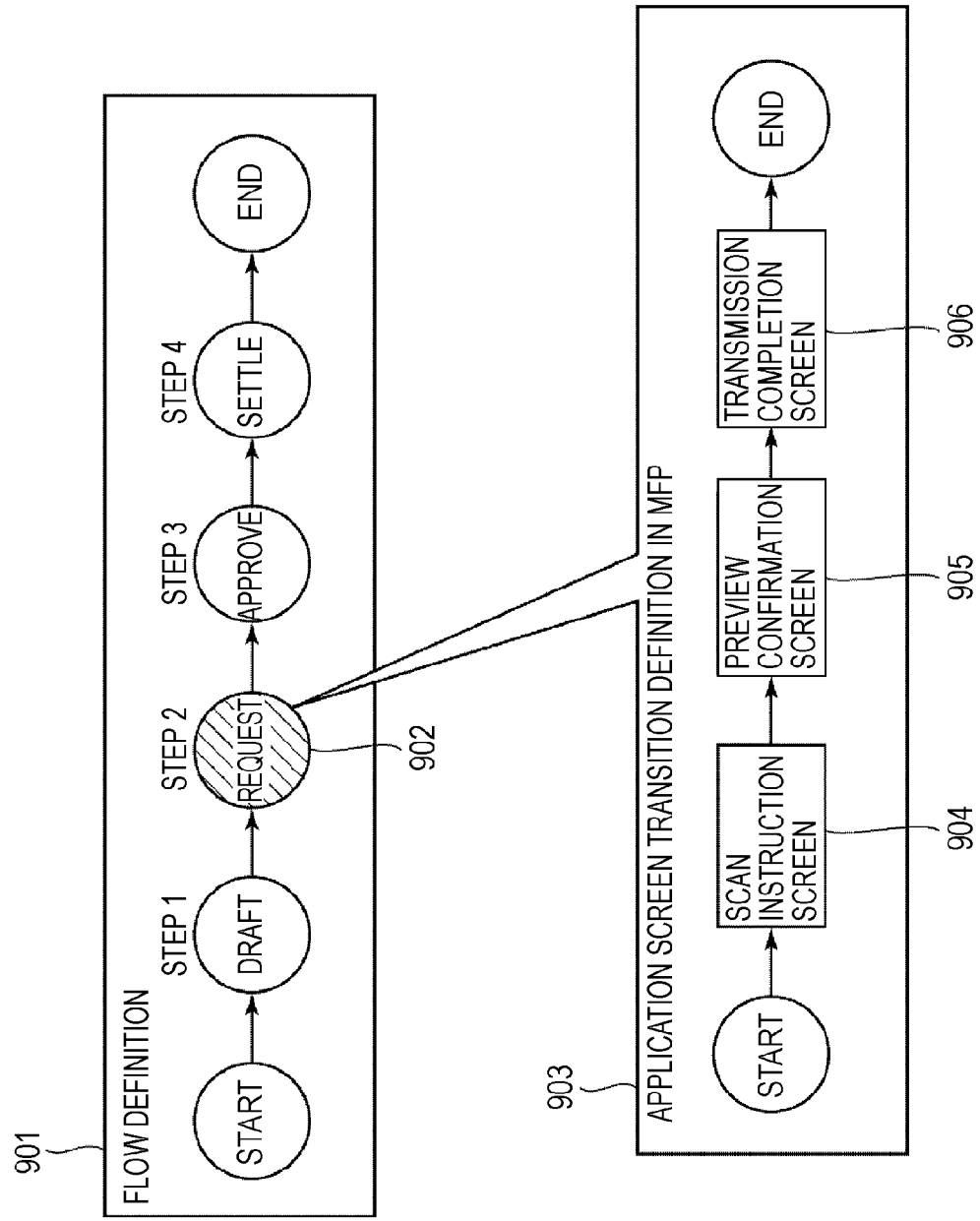
FIG. 9 shows an example of the configuration of a flow definition editor.
Figure 10:
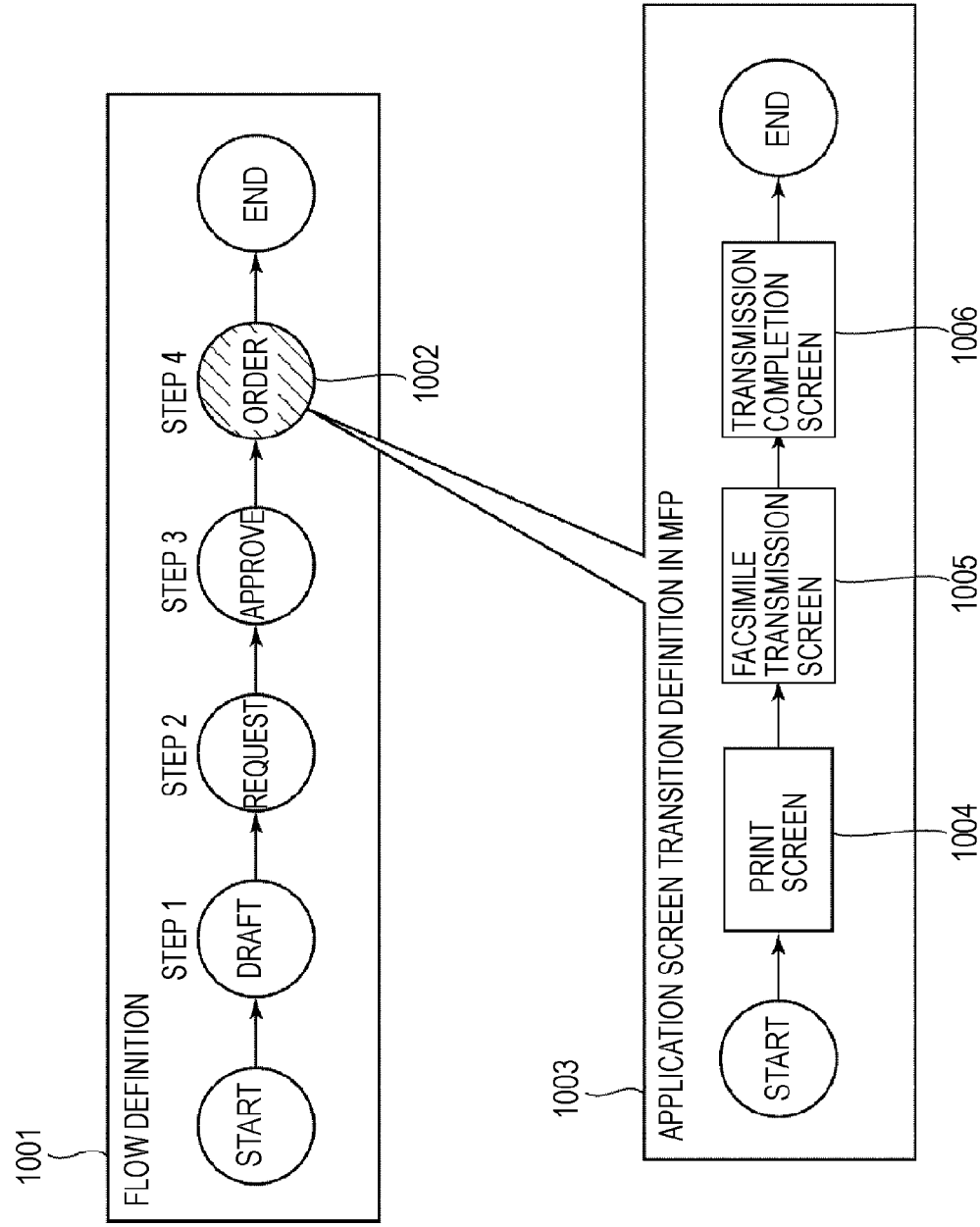
FIG. 10 shows examples of flow definition and subflow definition.

FIGS. 9 and 10 show examples of a flow definition when a substep that can be processed by an MFP is contained in a certain flow definition. The application server 102 detects an instruction from the browser of the client 103. Circles in each step indicate a fixed form of process in response to a request from a customer. In each step, the user is made to input and approve a business form and a database from the browser of the client PC to the application server. After the person in charge performs processing defined for each step, when the application server detects a predetermined completion operation, the state transitions in such a manner as from step 1 to step 2.

When a flow 901 is started in response to a detection of an instruction, the flow begins from "draft". It is assumed that the draft process is completed by performing a predetermined input operation by a supervisor using the client PC 103. Then, the workflow proceeds to a step of request. There is also a case in which a portion or the whole of step 902 of "request" corresponding to step 2 of a certain flow definition 901 is desired to be processed using the MFP 100. It is possible for the supervisor to define the screen transition definition of the application in the MFP as a subflow definition 903. The subflow definition is an example of definition information. The subflow definition 903 includes screen transition specification information denoted as 904, 905, 906 and the like. On the other hand, when step 1002 of "order" corresponding to step 4 of a flow definition 1001 is processed using the MFP 100, the screen transition definition of the application in the MFP is defined as a subflow definition 1003. The subflow definition 1003 contains screen transition specification information 1004, 1005, 1006, and the like. In the subflow definition 903, the scan functions of the MFP can be used, and in the subflow definition 1003, the print functions and the facsimile functions of the MFP can be used. Combinations of screen transition can also be defined. That is, in one step of a certain flow definition, the use function of the application in the MFP and the screen transition can be easily changed.

FIGS. 11 and 12 show the structure of a table for managing flow definition information. Reference numeral 1101 denotes a table of a flow definition list. Reference numeral 1102 denotes a flow definition ID, and reference numeral 1103 denotes a flow definition name. A table that is relational to the table 1101 is a table 1111 of a step list. Reference numeral 1112 denotes a flow definition ID. Reference numeral 1113 denotes a step ID. Reference numeral 1114 denotes a step name. Reference numeral 1115 denotes a subflow ID. Reference numeral 1201 denotes a column of a subflow definition list. Reference numeral 1202 denotes a subflow ID. Reference numeral 1203 denotes a subflow definition name. Reference numeral 1211 denotes a table of a step list in the subflow definition. Reference numeral 1212 denotes a subflow ID. Reference numeral 1213 denotes a substep ID. Reference numeral 1214 denotes a substep name.

Definition information, such as the flow definitions 901 and 1001, is stored in the table 1101. Definition information, such as steps 902 and 1002, is stored in the table 1111. Definition information, such as the subflow definitions 903 and 1003, are stored in the table 1201. Screen transition specification information in the subflow is stored in the table 1211. These pieces of definition information are managed by the workflow management module 703, and are loaded when the workflow is performed and used.

FIG. 13 shows an example in which the subflow definition 903 is represented using XML (Extensible Markup Language) so that it can be received by the application 407 or the like executed by the MFP 100. Reference numeral 1301 denotes XML data in which a subflow definition is represented. Reference numeral 1302 denotes a declaration of being a subflow. Reference numeral 1311 denotes an ID of the subflow, in which it is defined that the screen is composed of three screen transitions of a scan start 1312, a scan preview 1322, and a transmission result confirmation 1333. These definitions correspond to screens 1501, 1511, and 1521 of FIG. 15.

On the first scan start screen, it is shown that a color mode 13141, a resolution 13142, and a file format 13143 can be specified. These correspond to 1503, 1504, and 1505 in FIG. 15, respectively, and will be described in detail later.

Figure 15:
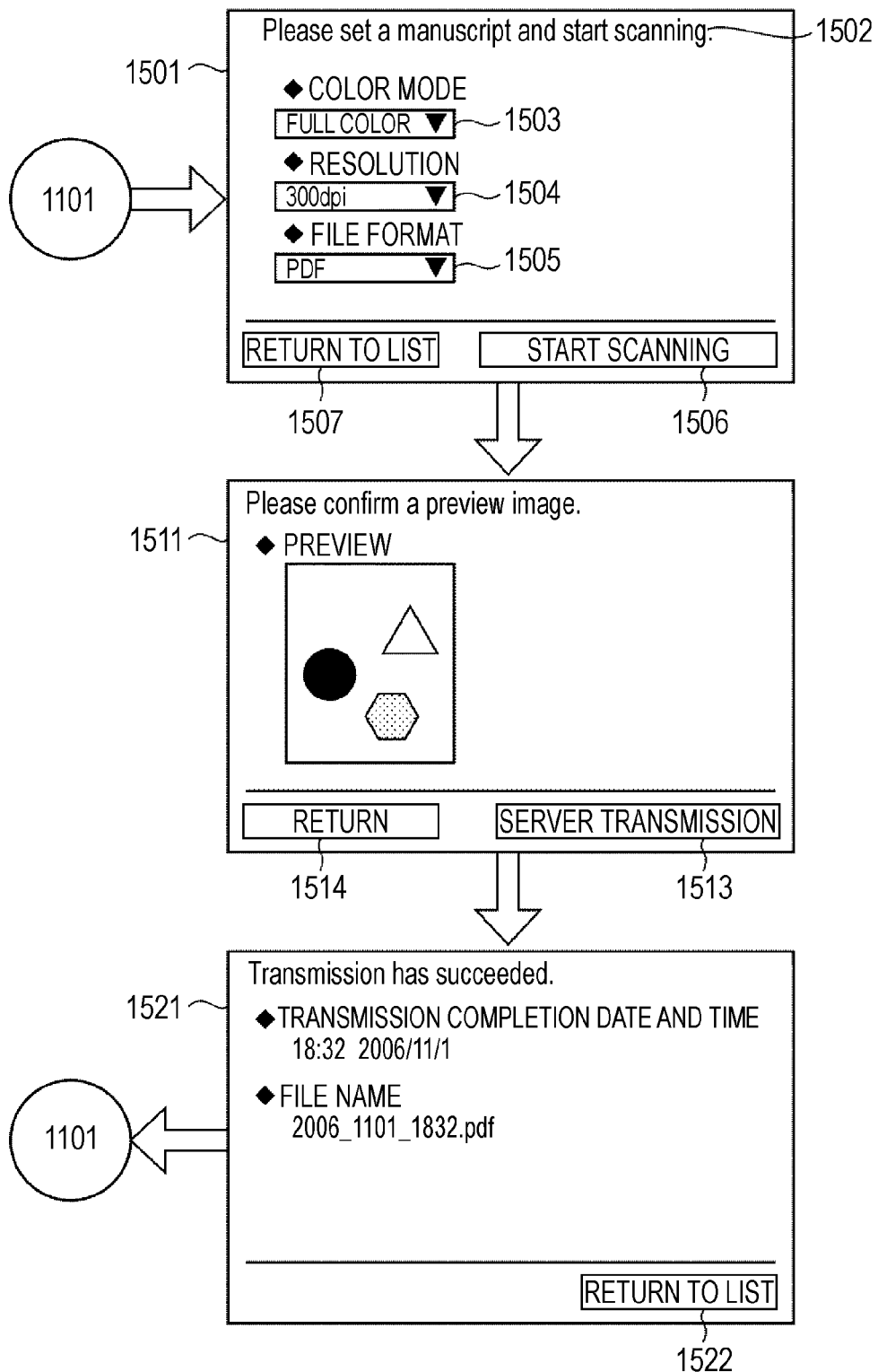
FIG. 15 shows an example of screen transition displayed on the MFP 100.
Figure 16:
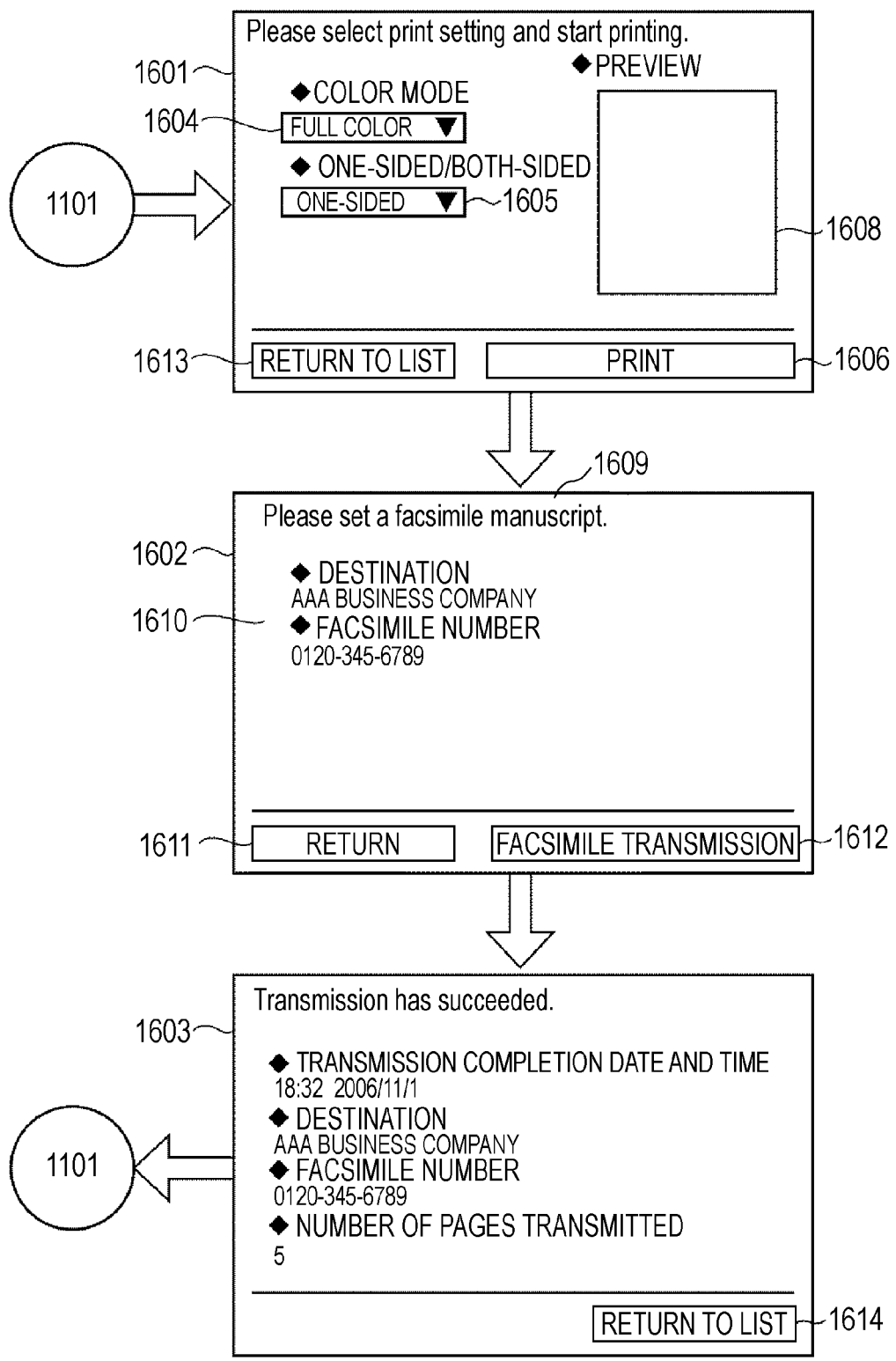
FIG. 16 shows an example of screen transition displayed on the MFP 100.

FIGS. 14, 15, and 16 show examples of execution screens of the subflow definitions 903 and 1003 in an application of an MFP.

The MFP 100 accesses the application server 102 in order to receive work item list information. For example, when the user inputs a user ID and a password from the operation unit of the MFP 100, these are transmitted to the application server 102. The application server 102 searches the database system 702 by using a user name as a key. As a result, a list of work items corresponding to the user is obtained and is transmitted to the MFP 100. Then, the operation unit of the MFP displays a screen denoted as 1401. Reference numeral 1401 denotes a screen for displaying information on a list of work items awaiting processing, which can be processed by the user using the MFP. Reference numeral 1402 denotes a control panel for displaying a list of work items waiting to be processed. Reference numerals 1403 and 1404 each denote a work item waiting to be processed.

A work item at the time of execution, which corresponds to step 902 of the flow definition 901, is assumed to be the work item 1403. A work item at the time of execution, which corresponds to step 1002 of the flow definition 1001, is assumed to be the work item 1404.

When a control button 1405 is pressed, the processing of the work item 1403 is started and the screen transitions to a scan instruction screen 1501. That is, the execution screen of the screen transition specification information 904 is denoted by 1501. The screen transition specification information 904 corresponds to a "sub_process" element 1311 of the subflow definition XML 1301. The "sub_process" element 1311 includes a "screen" element 1312, a "guidance" element 1313, an "option_settings" element 1314, a "forward" element 1315, and a "backward" element 1316. The "screen" element 1312 specifies the screen 1501. The "guidance" element 1313 specifies a guidance message 1502. The "option_settings" element 1314 specifies a display specification of an option setting control panel 1503. The "forward" element 1315 specifies calling of a scan function specified by the "function" element when the control button 1506 is pressed, and has a transition destination screen in the "target" element. That is, after the control button 1506 is pressed, the scan function is called, and the screen transitions to the screen 1511 corresponding to the "sub_process" element 1321 in which the "id" attribute has a value of "002". Furthermore, when the scan function is to be called, a set value selected by the option setting control 1503 is used. The "backward" element 1316 has a transition destination screen when the control button 1507 is pressed in the "target" element. That is, after the control button 1507 is pressed, the screen transitions to the screen 1101 corresponding to the "home".

Hereinafter, in a similar manner, the screen transition specification information 905 becomes the screen 1511 at the time of execution in such a manner as to correspond to the "sub_process" element 1321, and controls the transition destination when the control button 1513 or 1514 is pressed. The screen transition specification information 906 becomes the screen 1521 at the time of execution in such a manner as to correspond to the "sub_process" element 1331, and controls the transition destination when the control button 1522 is pressed.

The screens at the time of execution, which correspond to the screen transition specification information 1004, 1005, and 1006 of the subflow definition 1003, are screens 1601, 1602, and 1603, respectively. As described above, by only changing the subflow definition, it is possible to change the screen transition of an application in the MFP and functions to be used in one step.

Figure 17:
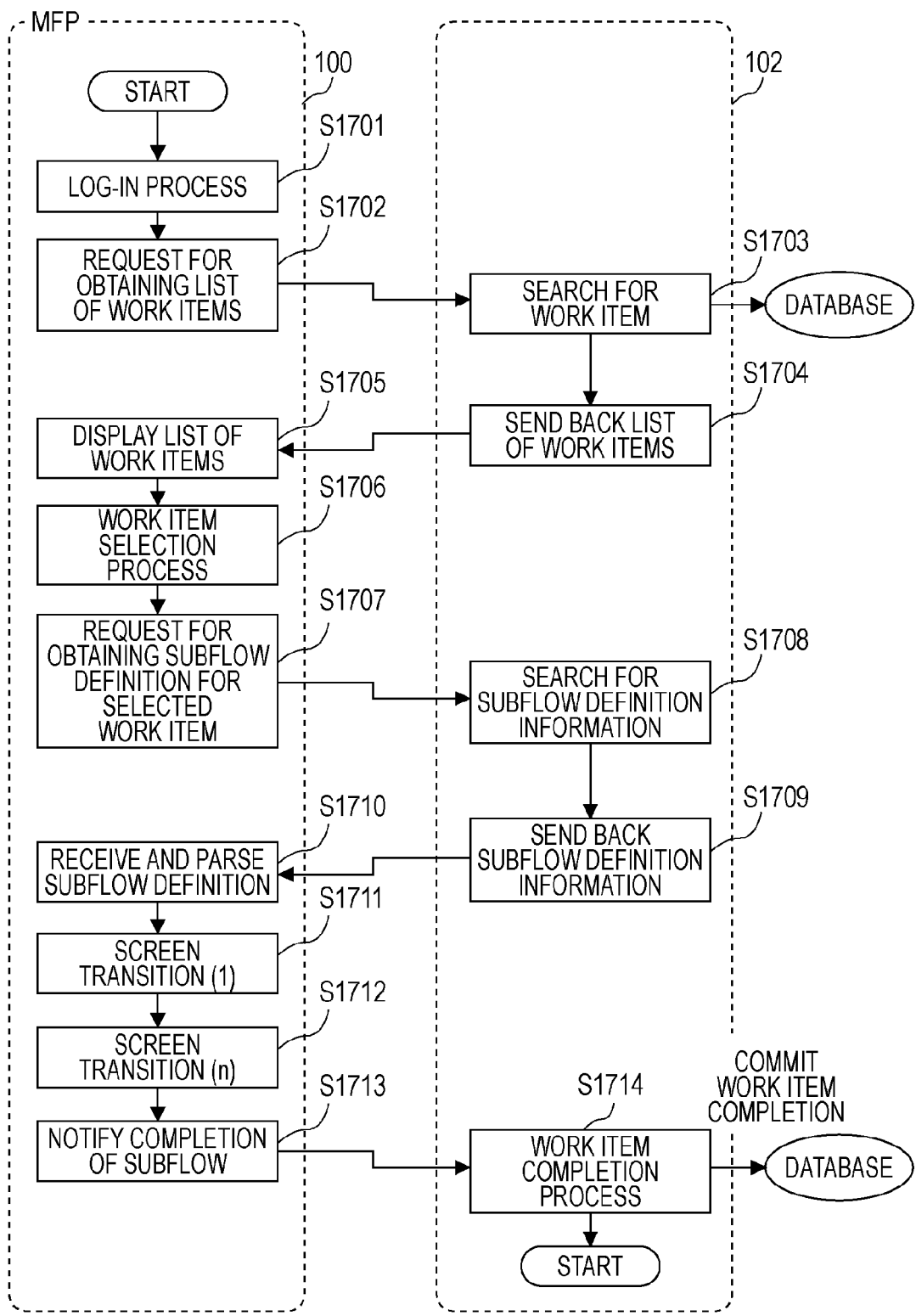
FIG. 17 shows an example of the operation flowchart of a workflow system.

FIG. 17 shows a processing flowchart. In the MFP 100, the user performs a log-in operation by using the UI unit 202 of FIG. 2, and thus a log-in process is performed (S1701). The MFP 100 transmits a request for obtaining a list of work items for the logged-in user to the application server 102 (S1702). The application server 102 receiving the request searches the database for a list of work items for the logged-in user (S1703). Each work item is equivalent to a work item 604 of the instance 603 at the time of execution of FIG. 6.

The application server 102 sends back information on the list of work items to the MFP 100 (S1704). On the basis of the received list information, the MFP 100 displays, in a list, work items 1403 and 1404 for the logged-in user on the screen 1401 of FIG. 14 (S1705). In the MFP 100, pressing of the control buttons 1405 and 1406 of FIG. 14 is waited for. In the MFP 100, when the pressing of a button is detected, a process is performed for selecting a work item (S1706). Then, the MFP 100 transmits a request for obtaining a subflow definition corresponding to the selected work item to the application server 102 (S1707). The application server 102 searches the tables 1101, 1111, 1201, and 1211 of FIGS. 11 and 12 for the subflow definition information corresponding to the selected work item (S1708).

For example, when the selected work item is a work item in a "request" step in the "transportation fee request flow", a search is performed in the following procedure. In the table 1101, a flow definition ID 1102 in the "transportation fee request flow" is "1". In the "request" step, a step ID is "2". This is recognized when the control button 1405 is pressed by using a prestored workflow definition. When a search for a record in which the flow definition is "1" and the step ID is "2" is performed in the table 1111, the fact that a subflow ID 1115 is "1" is found.

When a record in which the subflow ID is true, that is, "1" is found in the table 1201, it is found that the subflow definition name 1203 is "scan transmission". Furthermore, when a record in which the subflow ID is "1" is searched for in the table 1211, three records in which the substep ID 1213 is "1", "2", or "3" are found. The subflow definition information obtained from the tables 1101, 1111, 1201, and 1211 is formed as the subflow definition XML 1301 of FIG. 13 and is sent back to the MFP 100 (S1709). The MFP 100 receives the subflow definition XML 1301, parses it, and obtains necessary control information (S1710). The control information of the subflow definition 1301 represents the subflow definition 903 of FIG. 9, and control information necessary for the screen transition of 904, 905, and 906. On the basis of the obtained control information, the MFP 100 allows the screen to transition to application screens 1501, 1511, and 1521 of FIG. 15, which correspond to the screens of 904, 905, and 906, respectively (S1711 and S1712). On the application screen 1521 of FIG. 15, when the execution of the subflow is completed, the MFP 100 transmits the notification of the subflow completion to the application server 102 (S1713). When the application server 102 receives the notification of the subflow completion, the application server 102 performs a process for completing the processed work item (S1714). As a result, since a certain step is completed as a result of processing using the MFP 100, the workflow proceeds to the next step. That is, when the application server receives the subflow completion report from the MFP 100, the application server performs the following processing. That is, the flow definition information of FIG. 9 is referred to, and the state transitions to the step of "approve" next to the step of "request". The state transition is managed by a workflow engine. When the state transitions to the approval step, the owner of the work item is changed to a user such as a manager. If the button 1522 is pressed, the screen 1521 changes to the screen 1401.

Similarly, the processing of FIG. 10 can also be performed.

When step 4, i.e., "order", is started, a workflow to be operated is started using the MFP 100.

With reference to FIG. 16, it is detected in step 4 that a subflow is started. Then, preparations are made for transmitting a subflow screen in which three screen transitions of FIG. 16 are defined from the application server to the MFP 100. Then, when the application server detects that a work item corresponding to the subflow has been selected, screen transition information in which the prepared screen transition is defined is transmitted to the MFP 100. An example of the flow definition information is screen transition information. In the MFP 100, a screen 1601 is displayed. Then, the screen transition information is referred to, and business form data to be previewed is identified. For example, business form data is received by the MFP 100 from the database of the application server, and is displayed on a panel 1608 of FIG. 16. The user indicates and selects panels 1604 and 1605, and performs print setting, such as a color mode (full color, red/black, three colors, monochrome), and both-sided/one-sided, and the like. This has been defined in the screen transition information, and information received from the application server is used. At this point, when the pressing of the button of a print button 1606 is detected, printing/output is performed using the MFP 100 by using the above-described print setting. Then, the screen automatically transitions to a screen 1602. A guidance 1609 showing a technique of facsimile transmission that is described in the screen transition information in advance is displayed. Destination information 1610 is displayed together with the guidance information. The user may autograph or affix a seal on the output printing paper, or fill in a predetermined form. If necessary, here, the presence or absence of a receipt and a voucher attached separately is described. Then, the filled-in printing paper and the necessary voucher are placed in the reading holder of the MFP 100. This destination information 1610 is confirmed, and a facsimile transmission button 1612 is pressed. If a button 1611 is pressed, the screen 1602 goes back to the screen 1601. Then, the printing paper placed by the user is read and a facsimile is transmitted to the destination written in the destination information 1610 contained in the screen transition information. If there are originals of vouchers and receipts, they may be sent by mail to a predetermined section offline separately together with the printing paper transmitted by facsimile. When the facsimile transmission is completed, it is defined in the screen transition information that the screen automatically transitions from the screen 1602 to the screen 1603. When a button 1613 or 1614 is pressed to return to a list, the MFP 100 requests the application server to transmit a work item list screen. The MFP 100 displays the received or already received list screen.

In accordance with an embodiment, the MFP 100, which is an image-forming apparatus that communicates with the application server 102, which is an example of a server apparatus that performs a specific workflow, has been disclosed. The image-forming apparatus may be an MFP, a facsimile apparatus or a printer. The MFP 100 has the network interface 210 for receiving the flow definition information defined in a specific workflow step from the server apparatus. The controller unit 208 controls the display of the screen of the operation unit 202 of the image-forming apparatus in accordance with the received flow definition information.

The controller unit 208 notifies the server apparatus of the completion of the flow in the MFP 100.

The controller unit 208 controls the display of the screen transition in accordance with the flow definition information.

UI may be displayed and presented on the UI unit 202 of the MFP 100 such that the flow definition information can be edited.

The controller unit 208 displays a control screen that is displayed as a user interface of an application that can be executed in the MFP 100 in accordance with the flow definition information.

The controller unit 208 displays a screen based on the definition information of the subflow in the MFP 100, and notifies the application server 102 of the completion of the subflow corresponding to the definition information when a specific input occurs via the screen.

By using a facsimile, a printer, electronic mail, and the file transfer function of the MFP 100, processing defined by the definition information of the specific subflow is performed.

The flow definition information contains information for displaying a screen for printing data and a screen for performing facsimile transmission in response to the completion of printing on the basis of an instruction given via the screen. Furthermore, the notification unit may notify the completion in response to the completion of facsimile transmission (FIG. 16).

The flow definition information contains information for displaying a screen for instructing print setting, a print preview screen of data that is set via the screen, and a screen of an instruction part for transmitting a previewed image to the server apparatus (FIG. 15).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-344280 filed Dec. 21, 2006, which is hereby incorporated by reference herein in its entirety.

What is claimed is:

1. An image-forming apparatus comprising:
a display unit configured to display on an operation unit of the image-forming apparatus a list of work items corresponding to a workflow which is implemented using a server apparatus;
a receiving unit configured to receive data corresponding to a subflow from the server apparatus, the subflow being a step in the workflow and including a plurality of steps having a sequence;
an accepting unit configured to accept an instruction from a user for proceeding to a next step in the subflow;

a control unit configured to display a screen corresponding to a first step that is one of the plurality of steps in the subflow on the operation unit of the image-forming apparatus based on the data received by the receiving unit and to change a display of the operation unit to a screen corresponding to a second step following the first step in accordance with the instruction accepted by the accepting unit and the sequence of the plurality of steps in the subflow without displaying the list;

a notification unit configured to notify the server apparatus of a completion of the subflow corresponding to the data which the receiving unit receives, and a screen unit configured to display a list button to return to the list of work items in screens corresponding to a first step and a final step of the plurality of steps having the sequence in the subflow, comprising at least 3 steps, and display a back button to return to a previous screen in a screen corresponding to a mid-flow step which is not either of the first step and the final step, wherein, in response to the notification unit notifying the completion of the subflow, the server apparatus proceeds the step in the workflow corresponding to the completed subflow to a next step in the workflow, wherein the screen corresponding to the mid-flow step is a screen which does not accept pressing the list button from a user.

2. The image-forming apparatus according to claim 1, further comprising an edit unit configured to edit the workflow.

3. An image-forming apparatus according to claim 1, wherein the control unit controls the screen unit not to display the list button in the screen corresponding to the mid-flow step so as to control the screen corresponding to the mid-flow step not to accept pressing the list button from the user.

4. The image-forming apparatus according to claim 1,
wherein the screen unit displays the screen based on definition information of the subflow, and
wherein the notification unit notifies the server of the completion of the subflow corresponding to the definition information when a specific input occurs via the screen.

5. The image-forming apparatus according to claim 1, wherein the notification unit further notifies the completion in response to the completion of facsimile transmission.

6. A workflow system comprising:
a server apparatus implementing a workflow; and
an image-forming apparatus communicating with the server apparatus,
wherein the image-forming apparatus comprises:
  a display unit configured to display on an operation unit of the image-forming apparatus a list of work items corresponding to a workflow which is implemented using a server apparatus;
  a receiving unit configured to receive data corresponding to a subflow from the server apparatus, the subflow being a step in the workflow and including a plurality of steps having a sequence;
  an accepting unit configured to accept an instruction from a user for proceeding to a next step in the subflow;
  a control unit configured to display a screen corresponding to a first step that is one of the plurality of steps in the subflow on the operation unit of the image-forming apparatus based on the data received by the receiving unit and to change a display of the operation unit to a screen corresponding to a second step following the first step in accordance with the instruction accepted by the accepting unit and the sequence of the plurality of steps in the subflow without displaying the list; and
  a notification unit configured to notify the server apparatus of a completion of the subflow corresponding to the data which the receiving unit receives, and
a screen unit configured to display a list button to return to the list of work items in screens corresponding to a first step and a final step of the plurality of steps having the sequence in the subflow, comprising at least 3 steps, and display a back button to return to a previous screen in a screen corresponding to a mid-flow step which is not either of the first step and the final step,
wherein the screen corresponding to the mid-flow step is a screen which does not accept pressing the list button from a user,
wherein the server apparatus comprises:
  a proceeding unit configured to proceed the step in the workflow corresponding to the completed subflow to a next step in the workflow, in response to the notification unit notifying the completion of the subflow.

7. The workflow system according to claim 6 wherein the server apparatus further comprises an edit accepting unit configured to accept an edit of the workflow.

8. The workflow system according to claim 6 wherein the image-forming apparatus further comprises an edit unit configure to edit the workflow.

9. The workflow system according to claim 6,
wherein the data is in an XML format, and
wherein the server apparatus further comprises a sending unit configured to send the data obtained by denoting each step in the subflow as an element to the image-forming apparatus.

10. The workflow system according to claim 6 further comprising a transmit unit configured to prepare a screen transition when an application server detects that the subflow is started, and transmit screen transition information in which the prepared screen transition is defined to the image-forming apparatus when the application server detects that a work item corresponding to the subflow has been selected.

11. A control method comprising steps of:
displaying on an operation unit of an image-forming apparatus a list of work items corresponding to a workflow which is implemented using a server apparatus;
receiving data corresponding to a subflow from the server apparatus, the subflow being a step in the workflow and including a plurality of steps having a sequence;
accepting an instruction from a user for proceeding to a next step in the subflow;
controlling to display a screen corresponding to a first step that is one of the plurality of steps in the subflow on the operation unit of the image-forming apparatus based on the data received in the receiving step and to change a display of the operation unit to a screen corresponding to a second step following the first step in accordance with the instruction accepted by the accepting unit and the sequence of the plurality of steps in the subflow without displaying the list;
notifying the server apparatus of a completion of the subflow corresponding to the data which the receiving step receives;
displaying a list button to return to the list of work items in screens corresponding to a first step and a final step of the plurality of steps having the sequence in the subflow, comprising at least 3 steps, and displaying a back button to return to a previous screen in a screen corresponding to a mid-flow step which is not either of the first step and the final step; and proceeding the step in the workflow corresponding to the completed subflow to a next step in the workflow, in response to notifying the server apparatus of the completion of the subflow, wherein the screen corresponding to the mid-flow step is a screen which does not accept pressing the list button from a user.

12. A non-transitory computer-readable storage medium storing a control program, which when loaded into a computer and executed performs a method for use with an image-forming apparatus capable of communicating with a server apparatus for performing a workflow, the method comprising:

displaying on an operation unit of an image-forming apparatus a list of work items corresponding to a workflow which is implemented using a server apparatus;

receiving data corresponding to a subflow from the server apparatus, the subflow being a step in the workflow and including a plurality of steps having a sequence;

accepting an instruction from a user for proceeding to a next step in the subflow;

displaying a screen corresponding to a first step that is one of the plurality of steps in the subflow on the operation unit of the image-forming apparatus based on the data received by the receiving step and to change a display of the operation unit to a screen corresponding to a second step following the first step in accordance with the instruction accepted by the accepting step and the sequence of the plurality of steps in the subflow without displaying the list; and notifying the server apparatus of a completion of the subflow corresponding to the data which is received in the receiving step, displaying a list button to return to the list of work items in screens corresponding to a first step and a final step of the plurality of steps having the sequence in the subflow, comprising at least 3 steps, and display a back button to return to a previous screen in a screen corresponding to a mid-flow step which is not either of the first step and the final step; and wherein, in response to notifying the server apparatus of the completion of the subflow, the server apparatus proceeds the step in the workflow corresponding to the completed subflow to a next step in the workflow wherein the screen corresponding to the mid-flow step is a screen which does not accept pressing the list button from a user.

13. The non-transitory computer-readable storage medium according to claim 12, the method further comprising editing the workflow.

* * * * *